US012595320B2

(12) United States Patent
Gambrel et al.

(10) Patent No.: US 12,595,320 B2
(45) Date of Patent: Apr. 7, 2026

(54) METHOD OF CONTROLLING ALPHA-OLEFIN CONDENSATION IN ABSORPTION MEDIA DURING POLYOLEFIN PRODUCTION

(71) Applicant: DOW GLOBAL TECHNOLOGIES LLC, Midland, MI (US)

(72) Inventors: Timothy W. Gambrel, Lake Jackson, TX (US); John D. Hebert, Rayong (TH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 512 days.

(21) Appl. No.: 18/034,612

(22) PCT Filed: Nov. 2, 2021

(86) PCT No.: PCT/US2021/057647
§ 371 (c)(1),
(2) Date: Apr. 28, 2023

(87) PCT Pub. No.: WO2022/094442
PCT Pub. Date: May 5, 2022

(65) Prior Publication Data
US 2023/0399421 A1 Dec. 14, 2023

Related U.S. Application Data

(60) Provisional application No. 63/108,638, filed on Nov. 2, 2020.

(51) Int. Cl.
*C08F 6/10* (2006.01)
*C08F 6/02* (2006.01)

(52) U.S. Cl.
CPC . *C08F 6/10* (2013.01); *C08F 6/02* (2013.01)

(58) Field of Classification Search
CPC ........................................................ C08F 6/06
See application file for complete search history.

(56) References Cited

U.S. PATENT DOCUMENTS 3,969,470 A * 7/1976 Spiegelman .......... C08F 210/18
525/240
4,581,052 A * 4/1986 Adler ...................... C01B 32/55
62/124

(Continued)

FOREIGN PATENT DOCUMENTS

CA 2827839 A1 3/2015
GB 988999 A 4/1965

(Continued)

OTHER PUBLICATIONS

International Search Report for International Application No. PCT/US2021/057647 International Filing date Nov. 2, 2021; Report Mail Date Apr. 13, 2022; 4 pages.

(Continued)

*Primary Examiner* — Liam J Heincer
(74) *Attorney, Agent, or Firm* — CANTOR COLBURN LLP

(57) ABSTRACT

Disclosed herein is a method comprising discharging from a reactor to an absorber a product stream that comprises a polymer or interpolymer, a solvent and hydrochloric acid; absorbing the hydrochloric acid from the product stream in the absorber; discharging the product stream now devoid of substantially all hydrochloric acid to a first heat exchanger; wherein the first heat exchanger is operative to condense the product stream devoid of hydrochloric acid from the absorber; discharging a condensate from the first heat exchanger to a collection drum that is operative to receive a condensate from the first heat exchanger; splitting up the condensate in the collection drum into a slip stream and a second stream; and discharging the slip stream to a com- (Continued)

pressor; wherein the compressor is operative to pressurize the slip stream prior to recycling it to the absorber.

10 Claims, 1 Drawing Sheet

(56)                References Cited

U.S. PATENT DOCUMENTS

| 5,521,264 | A | * | 5/1996 | Mehra | C08F 6/005 |
| | | | | | 95/143 |
| 5,681,908 | A | * | 10/1997 | Mehra | B01J 8/0035 |
| | | | | | 95/143 |
| 5,720,926 | A | * | 2/1998 | Whipp | B01D 53/346 |
| | | | | | 422/111 |
| 2010/0132554 | A1 | * | 6/2010 | Huang | B01D 53/343 |
| | | | | | 95/227 |
| 2012/0088893 | A1 | | 4/2012 | Jog et al. | |
| 2013/0000301 | A1 | * | 1/2013 | Mattstedt | B01D 53/1425 |
| | | | | | 60/645 |
| 2014/0027285 | A1 | * | 1/2014 | Parisi | B01D 53/1425 |
| | | | | | 204/541 |
| 2016/0326283 | A1 | | 11/2016 | Effler et al. | |
| 2019/0255478 | A1 | * | 8/2019 | Subramanian | B01D 53/68 |
| 2019/0381448 | A1 | * | 12/2019 | Ingram | B01D 53/1456 |
| 2020/0207885 | A1 | * | 7/2020 | Curren | B01J 19/245 |

FOREIGN PATENT DOCUMENTS

| JP | H11152301 A | 6/1999 |
| WO | 2014138854 A1 | 9/2014 |

OTHER PUBLICATIONS

Uchytil et al.; "Study of capillary condensation of butane in a Vycor glass membrane"; Journal of Membrane Science; 264; Apr. 2005, pp. 27-36.
Written Opinion for International Application No. PCT/US2021/ 057647 International Filing date Nov. 2, 2021; Report Mail Date Apr. 13, 2022; 6 pages.

* cited by examiner

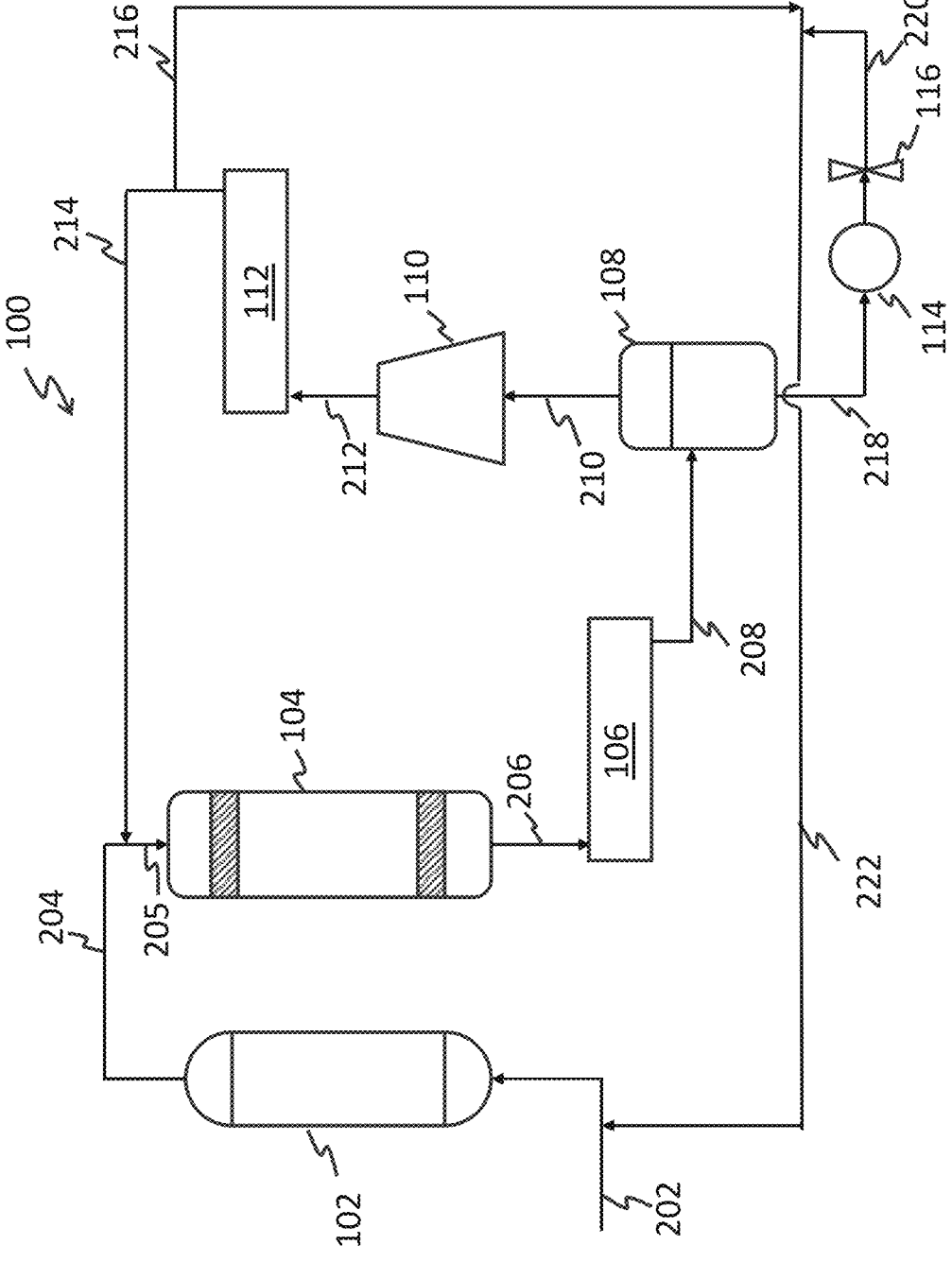

METHOD OF CONTROLLING ALPHA-OLEFIN CONDENSATION IN ABSORPTION MEDIA DURING POLYOLEFIN PRODUCTION

CROSS REFERENCE TO RELATED APPLICATIONS

This application is a National Stage application of PCT/US2021/057647, filed Nov. 2, 2021, which claims the benefit of U.S. Provisional Application No. 63/108,638, filed Nov. 2, 2020, both of which are incorporated by reference in their entirety herein.

BACKGROUND

Disclosed herein is a method of controlling the condensation of $\alpha$-olefins in absorption media during the production of polyolefins.

Alpha olefin comonomers (such as for example, 1-octene, 1-hexene, 1-butene, and the like) are copolymerized with ethylene monomer in a solution (or in a slurry) to manufacture a polyethylene copolymer. When Ziegler Natta catalysts are used to catalyze the polymerization of these monomers and comonomers, hydrochloric acid is generated as a byproduct of the catalyst deactivation process. The hydrochloric acid is undesirable and is removed by chemical reaction to form a salt in an absorption bed that contains an absorbent.

During the absorption process to remove the hydrochloric acid, some gaseous monomers and comonomers have the potential to condense in the pores of the absorbent thus reducing its effectiveness in removing the hydrochloric acid from the solution or slurry. This results in a reduced service life for the absorbent bed and in increased maintenance shutdowns, which reduce productivity and increase product costs.

It is therefore desirable to develop a system and a process that prevents condensation of monomers and comonomers in the absorption bed.

SUMMARY

Disclosed herein is a system comprising a reactor in fluid communication with an absorber; wherein the reactor receives a reaction stream that comprises a monomer, a comonomer, a solvent and a catalyst and converts the monomer and comonomer into a polymer or interpolymer; wherein the absorber comprises an absorption bed that is operative to absorb hydrochloric acid from a product stream received from the reactor; a first heat exchanger located downstream of the absorber and in fluid communication with the absorber; wherein the first heat exchanger is operative to condense a gaseous output from the absorber; a collection drum that is operative to receive a condensate from the first heat exchanger; wherein the condensate in the collection drum is split into a slip stream and a second stream; and a compressor; wherein the compressor lies downstream of the collection drum and wherein the compressor is operative to pressurize the slip stream prior to recycling it to the absorber.

Disclosed herein too is a method comprising discharging from a reactor to an absorber a product stream that comprises a polymer or interpolymer, a solvent and hydrochloric acid; absorbing the hydrochloric acid from the product stream in the absorber; discharging the product stream now devoid of substantially all hydrochloric acid to a first heat exchanger; wherein the first heat exchanger is operative to condense the product stream devoid of hydrochloric acid from the absorber; discharging a condensate from the first heat exchanger to a collection drum that is operative to receive a condensate from the first heat exchanger; splitting up the condensate in the collection drum into a slip stream and a second stream; and discharging the slip stream to a compressor; wherein the compressor is operative to pressurize the slip stream prior to recycling it to the absorber.

BRIEF DESCRIPTION OF THE FIGURES

The FIGURE is an exemplary schematic depiction of a system that prevents condensation of monomers and comonomers in the absorbent.

DETAILED DESCRIPTION

The term "ethylene-based solvent polymerization" refers to a polymerization process utilizing one or more solvents and a coordination catalyst. "Ethylene-based solvent polymerization" processes exclude free radical based, high pressure and gas-phase polymerization processes.

The term "polymerization reactor" refers to any reactor or combination of reactors useful in ethylene-based solvent polymerization, including one or more loop reactors, isothermal reactors, pipe flow reactors, stirred tank reactors, batch reactors, in parallel or series, and/or any combinations The term "coordination catalyst" means a catalyst used in addition polymerization, such as a Ziegler-Natta catalyst, a molecular catalyst, such as a constrained geometry catalyst, or a combination thereof.

The term "polymer" refers to a polymeric compound prepared by polymerizing monomers, whether the same or a different type "comonomer"). The generic term polymer thus embraces the term "homopolymer," unusually employed to refer to polymers prepared from only one type of monomer, and the term "interpolymer" as defined herein.

The term "interpolymer" refers to polymer prepared by the polymerization of at least two different types of monomers. The generic term interpolymer includes copolymers, usually employed to refer to polymer prepared from two different monomers, and polymers prepared from more than two different types of monomers. The term "ethylene/$\alpha$-olefin interpolymer" means a polymer having units derived from ethylene and units derived from an $\alpha$-olefin comonomer.

The term "ethylene-based polymer" refers to polymer that contains more than 50 mole percent units derived from ethylene (based on total amount of polymerizable monomer) and, optionally, may contain at least one comonomer.

The term "ethylene/$\alpha$-olefin interpolymer" refers to an interpolymer that contains more than 50 mole percent units derived from ethylene (based on total amount of polymerizable monomers) and at least one $\alpha$-olefin.

The term "polymerization by-products" means any compound, other than the intended interpolymer product, which is produced in the polymerization reactor, including but not limited to, hydrochloric acid, catalyst by-products, acid neutralizer, acid neutralizer by-products, water, hydrogen, ethylene and comonomer.

Disclosed herein is a solution polymerization system (for manufacturing polymers or interpolymers) that comprises a reactor in fluid communication with an absorber. The reactor polymerizes a monomer and/or comonomer feed stream in solution while the absorber receives a reaction product from the reactor and removes hydrochloric acid (that is generated as a byproduct during the polymerization process). The absorber is also part of a recycle loop that generates a slip stream at a higher temperature and pressure (when compared with other conventional absorbers used for removal of hydrochloric acid) and is fed back to the absorber. The use of the slip stream at higher pressures and temperatures prevents the condensation of monomers and comonomers in the pores of the absorbent. This increases the service life of the absorbing bed used in the absorber and reduces production costs.

Disclosed herein too is a method for manufacturing polymers or interpolymers in solution that comprises discharging a polymeric solution from a reactor to an absorber. The absorber functions to remove hydrochloric acid generated in the reactor during the reaction. A slip stream emanating from products generated in the absorber is fed to a heat exchanger and a compressor to increase its temperature and pressure. The slip stream is then recycled to the absorber at a flow rate, temperature and pressure effective to prevent condensation of gaseous monomers and comonomers in the absorbent. This increases the life cycle of the absorber while removing the hydrochloric acid from a reaction stream.

The FIGURE is an exemplary schematic depiction of a polymerization system 100 that comprises a reactor 102 in fluid communication with an absorber 104, a plurality of heat exchangers 106, 112, a compressor 110, a liquid collection drum 108 (hereinafter collection drum 108) and a liquid flow position valve indicator 116 (hereinafter position indicator 116). The absorber 104 lies downstream of the reactor 102.

Located downstream of the absorber 104 are a plurality of heat exchangers 106, 112, the collection drum 108 and a compressor 110. The first heat exchanger 106 lies downstream of the absorber 104 and upstream of the collection drum 108. The collection drum 108 lies upstream of the compressor 110 and the second heat exchanger 112. Fluid discharged by the second heat exchanger 112 is fed back to the absorber 104. The absorber 104, the first heat exchanger 106, the collection drum 108, the compressor 110 and the second heat exchanger 112 are therefore in a recycle loop.

Reactants are fed to the reactor 102 via stream 202. The reaction product from the reactor 102 is fed to the absorber 104 via stream 204. The absorber 104 contains an absorbent that absorbs hydrochloric acid and discharges the reaction product (now devoid of hydrochloric acid) in gaseous form to first heat exchanger 106 (via stream 206), which cools the gases to form a condensate. The condensate is discharged from the first heat exchanger 106 to the liquid drum 108 via stream 208, where it is split into a slip stream 210 and a secondary stream 218. Secondary stream 218 is discharged and ultimately recycled back to the reactor where the monomers and/or comonomers are subjected to further polymerization. The position indicator 116 or the liquid level rise in collection drum 108 may be used to determine the effectiveness of driving off condensable gases from the absorption bed in absorber 104.

The slip stream 210 is compressed in compressor 110 and discharged to the second heat exchanger 112 via stream 212. The second heat exchanger 112 is optional and its optionality is dependent upon the temperature to which the compressor 110 is used to heat the slip stream 210. If the compressor 110 can heat the slip stream to the desired temperature for entry to the absorber 104, then there is no need for the second heat exchanger 112. However, if the compressor heats the slip stream to a temperature that is higher than desired, then the second heat exchanger 112 is deployed to cool the slip stream to the desired temperature for entry into the absorber. In a preferred embodiment, the polymerization system 100 uses the second heat exchanger 112.

The second heat exchanger 112 cools the slip stream to a desired temperature and feeds the slip stream to the absorber 104 via stream 214. Any portion of the slip stream 214 that is not used is fed back to the reactor via stream 216 for further polymerization. The stream 214 emanating from the second heat exchanger 112 is generally higher in temperature than the stream 208 emanating from the first heat exchanger 106.

The collection drum 108 is in fluid communication with the position indicator 116 via an optional pump 114. Both the position indicator 116 and the collection drum 108 may be used to measure the effectiveness (e.g., the efficiency) of the system 100 in removing condensable gases from the product stream in the absorber 104. Either the collection drum liquid level in 108 or the position indicator 116 may be used to quantify the condensed gas that is removed from the absorber in the solution polymerization system 100. Put another way, they may be using singly or in combination to indicate the removal of condensed gases from the absorber.

The liquid collection drum 108 vapor stream is used to generate the slip stream. The change in the drum liquid level is used as a process indicator of the amount of liquids that are driven off the media and is a measure of the liquid collection efficiency of the absorber 104. The measuring of the efficiency of the absorber using the collection drum 108 is optional since the position indicator 116 may also be used to gauge the efficiency of the process for extracting monomers and/or comonomers from the absorber 104. In other words, when the solution polymerization system 100 contains the position indicator 116, the collection drum 108 may be used only for generating the slip stream if so desired. Details of the reactants along with other features of the process will now be provided.

The feed stream 202 carries reactants along with the catalyst and solvent(s) to the reactor 102. The reactants include olefin monomers and comonomers. Suitable olefin monomers include ethylene and alpha olefins having 3 to 12 carbon atoms. Illustrative examples of such alpha-olefin monomers are one or more of propylene, 1-butene, 1-pentene, 1-hexene, 1-octene and 1-decene. 1-butene is preferred.

The olefin monomer and/or comonomer is present in the feed stream 202 in an amount of 3 wt % to 65 wt %, based on the total weight of the feed stream 202. In a preferred embodiment, the olefin monomer and/or comonomer is present in the feed stream 202 in an amount of 6 wt % to 45 wt %, based on the total weight of the feed stream 202.

The polymerization reaction is conducted in the presence of an inert hydrocarbon solvent. Examples of inert hydrocarbon solvents include a $C_{5-12}$ hydrocarbon which may be unsubstituted or substituted by a $C_{1-4}$ alkyl group such as pentane, methyl pentane, hexane, heptane, octane, cyclohexane, methylcyclohexane and hydrogenated naphtha. An example of a suitable solvent is "ISOPAR ° E" ($C_{8-12}$ aliphatic solvent commercially available from Exxon Chemical Co.).

The solvent is present in the feed stream 202 in an amount of 52 wt % to 82 wt %, based on the total weight of the feed stream 202. In a preferred embodiment, the solvent is present in the feed stream 202 in an amount of 68 wt % to 74 wt %, based on the total weight of the feed stream 202.

Catalysts used can be Ziegler-Natta catalysts, bis-metallocene catalysts, constrained geometry catalysts, a polyvalent aryloxyether complex, a phosphinimine, or a combination thereof. Preferred catalysts are Ziegler-Natta catalysts.

The catalyst is present in the feed stream 202 in an amount of 0.2 ppm to 2.4 ppm, based on the total weight of the feed stream 202. In a preferred embodiment, the catalyst is present in the feed stream 202 in an amount of 0.25 ppm to 0.40 ppm, based on the total weight of the feed stream 202.

The monomer and/or comonomer is mixed with hydrogen and dissolved/dispersed in the solvent prior to being fed to the reactor 102 via stream 202. Prior to mixing, the solvent and monomers (sometimes referred to as "feedstock") are generally purified to remove potential catalyst poisons such as water, oxygen, or other polar impurities. The feedstock purification may employ molecular sieves, alumina beds or oxygen removal catalysts. The solvent may also be purified in a similar manner. The feeds to the reactor system 102 are generally cooled down to a temperature of less than 40° C., preferably less than 20° C. The cooling can be conducted either in the reactor system or prior to entry into the reactor. In a preferred embodiment, the cooling of the feed can be conducted prior to entry into the reactor.

Generally, the catalyst components may be premixed in the solvent for the reaction or fed as separate streams to one or multiple reactors in the reactor 102. The reactor 102 may be a continuous stirred tank reactors (CSTRs), a loop reactor (e.g., single loop reactor, double loop reactor), a boiling reactor, and can be a single or a multi-stage reactor. In an embodiment, this process may employ multiple catalysts in one or more reactors.

In an embodiment, the reactor 102 operates at a pressure of greater than 40 kilogram force per square centimeter (kgf/cm$^2$), preferably greater than 45 kgf/cm$^2$, and more preferably greater than 50 kgf/cm$^2$. In an embodiment, the reactor 102 operates at temperatures ranging from 155 to 210° C. In an embodiment, the polymer solution exiting the reactor 102 via stream 204 can have temperatures of 165 to 215° C., preferably 185 to 205° C.

This process can be used for making olefin-based polymers, such as ethylene homopolymers and interpolymers, interpolymers with other alkenes (for example, copolymers or terpolymers), and, optionally, a diene (for example an EPDM terpolymer).

In an embodiment, the product stream 204 leaving the reactor comprises ethylene in an amount of 0.75 to 5.5 weight percent (wt %), alpha-olefin in an amount of up to wt %, hydrocarbon solvent in an amount of up to 75 wt % and hydrochloric acid in an amount of up to 80 parts per million (ppm), based on the contents of product stream 204 between the reactor 102 and the absorber 104.

In a preferred embodiment, the product stream 204 leaving the reactor 102 comprises ethylene in an amount of 0.75 to 5.50 weight percent (wt %) in monomeric form, 1-butene in an amount of up to 15 wt %, hydrocarbon solvent in an amount of up to 75 wt % and hydrochloric acid in an amount of 10 to 30 parts per million (ppm), based on the contents of product stream 204 between the reactor 102 and the absorber 104.

The product stream 204 is discharged to the absorber 104 that contains a bed of absorbent (not shown). The absorbent comprises a porous material having a surface area of 150 to 2000 square meter per gram (m$^2$/g), preferably 200 to 1000 m$^2$/g (measured using BET nitrogen porosimetry) that can efficiently absorb hydrochloric acid gas that is generated as a byproduct during the polymerization reaction. The hydrochloric acid gas reacts to form a salt in the pores of the absorbent. When the absorbent is saturated with the absorbate, the bed of absorbent may be replaced with a new bed.

The absorbent has a bulk density of 752 to 753 kilograms per cubic meter (kg/m$^3$). The absorbent has a dynamic chloride capacity of 12 to wt %.

Suitable examples of absorbents are alumina, silica, clay (e.g., kaolin), exfoliated clays (e.g., vermiculite), calcium sulfate, or the like, or a combination thereof. A preferred absorbent is alumina (aluminum oxide).

It is undesirable for the absorbent to absorb other monomers or comonomers that may be used to produce the polymer. It is desirable for these monomers and comonomers to be recycled to the reactor where they can be consumed in polymer production. However, in other solution based conventional processes for producing polyolefins, gaseous comonomers such as for example, 1-butene, 1-octene, 1-hexene and the like, may also condense in the pores of the absorbent in addition to gaseous hydrochloric acid. In order to prevent monomers and comonomers from condensing in the pores of the absorbent, a portion of the stream 206 emanating from the absorber 104 is recycled back to the absorber 104 at a higher temperature and pressure than the original product stream 204 emanating from the reactor 102. This portion of the original stream that is recycled to the absorber 104 is termed a slip stream. The use of a slip stream that has a higher pressure and temperature than the original product stream 204 prevents the monomers and/or comonomers present in the combined stream 205 (the combined stream 205 includes stream 204 and recycle stream 214 (detailed later)) from condensing in the pores of the absorbent.

The stream 206 that is discharged from the absorber 104 contains a reduced amount of the hydrochloric acid (compared with product stream 204) and is discharged to a first heat exchanger 106. In an embodiment, the stream 206 leaving the absorber 104 comprises ethylene in an amount of 60 to 100 wt %, alpha-olefin in an amount of up to 40 wt %, hydrocarbon solvent in an amount of up to 10 wt % and hydrochloric acid in an amount of up to 1 ppm, based on the contents of stream 206 between the absorber 104 and the first heat exchanger 106.

In a preferred embodiment, the stream 206 leaving the absorber 104 comprises ethylene in an amount of 70 to 100 wt %, 1-butene in an amount of up to 40 wt %, hydrocarbon solvent in an amount of up to 10 wt % and hydrochloric acid in an amount of 0 to 1 ppm, based on the contents of stream 206 between the absorber 104 and the first heat exchanger 106. In an embodiment, the stream 206 contains no hydrochloric acid after it is discharged from the absorber 104.

The first heat exchanger 106 preferably cools the stream 206 (thereby condensing the gases to liquid) and discharges it to the liquid collection drum 108. The condensing of the gases in the collection drum 108 to a liquid reduces the volume of material that is discharged to the compressor 110 from the drum 108. This reduces compressor load.

The heat exchanger 106 is at least one of a shell and tube heat exchanger, a plate heat exchanger, a plate and fin heat exchanger, or a plate and shell heat exchanger. In a preferred embodiment, the heat exchanger 106 is a shell and tube heat exchanger that uses chilled ethylene glycol to condense the gases emanating from the absorber 104 to a liquid.

As noted above, the condensed stream 208 emanating from the first heat exchanger 106 is discharged to the liquid collection drum 108. The height (or volume) of a column of liquid in the liquid collection drum 108 can be used to gauge the efficiency of gas removal from the absorber 104 during the process. The collection drum operates at a temperature of −20° C. to +20° C., preferably −10° C. to +10° C. These temperatures facilitate condensation of any gases that may not have undergone condensation in the first heat exchanger 106.

The amount of liquid collected in the liquid collection drum 108 per unit time provides information about the performance of the absorber 104. If a significant amount of the monomer and/or comonomer condenses in the pores of the absorbent, then the amount of liquid collected in the liquid collection drum 108 would be less than that collected if the monomer and/or comonomer does not substantially condense in the pores of the absorbent. Put another way, the collection drum 108 may be used to determine the effectiveness of selected pressures, temperatures and flow rate of the slip stream 210. These are discussed in detail below.

As seen in the FIGURE, a portion of the condensed liquid in the collection drum 108 is discharged back to the absorber as slip stream 214, while the remainder is discharged and ultimately recycled back to the reactor via position indicator 116 and optional pump 114. The position indicator 116 may be a mass flow rate meter or may be a liquid flow valve position indicator, where the position of the valve is used to indicate the flow rate. A greater flow rate as indicated by the position indicator 116 would imply that a substantially smaller amount of monomer and/or comonomer condensation occurs in the pores of the absorbent when compared with a lower flow rate.

The slip stream 210 comprises 70 to 80 wt % of the stream 208 that enters the collection drum 108. The slip stream 210 is discharged to compressor 110 where it is compressed to a pressure of 15 to 20 kilograms per square centimeters (kg/cm$^2$), preferably 17 to 18 kg/cm$^2$. During compression, the temperature of the slip stream 212 may range from to 250° C., preferably 110 to 120° C. The compressor 110 heats up the slip stream 210 during compression.

If the slip stream temperature is increased during compression to a temperature of 20° C. to 250° C., preferably 20 to 40° C., above the temperature of the product stream 204 at the absorber inlet, then the second heat exchanger 112 is an optional feature. If on the other hand, the compression results in a temperature increase that is greater than the desired temperature at the absorber inlet, the second heat exchanger 112 can be used to reduce the temperature to the desired value of 20° C. to 250° C., preferably 20 to 40° C., above the temperature of the product stream 204.

The pressurized slip stream 212 is discharged from the compressor 110 to the second heat exchanger 112 where its temperature is reduced to be at a value of 20 to 250° C. greater than the temperature of the product stream 204. The second heat exchanger 112 therefore functions to reduce the temperature of the pressurized slip stream 212. In a preferred embodiment, the recycled slip stream 214 that is discharged from the second heat exchanger 112 has a pressure of 15 to 20 kg/cm$^2$, preferably 17 to 18 kg/cm$^2$. The temperature of the recycled slip stream 214 is preferably 20 to 40° C. greater than the temperature of product stream 204 that enters the absorber 104 from the reactor 102.

The increased pressure of the recycled slip stream 214 relative to the pressure of product stream 204 promotes an increased flow rate of the combined stream 205 entering absorber 204. Stream 205 is a combination of the product stream 204 emanating from the reactor 102 and the slip stream 214 emanating from the second heat exchanger 112. Stream 205 is referred to as the combined stream. This increased flow rate of the combined stream 205 along with the increased temperature of the gases entering the absorber 104 (due to the increased temperature, pressure and flow rate of the recycled slip stream 214) prevents condensation of the gaseous monomers and comonomers in the absorbent (contained in the absorption bed). From the FIGURE it may be seen that a portion of the slip stream 214 that is not recycled is discharged and ultimately recycled back to the reactor for further processing. This portion of the slip stream 214 is denoted as stream 216.

The recycled slip stream 214 comprises ethylene in an amount of 55 to 100 wt %, alpha-olefin in an amount of up to 40 wt %, hydrocarbon solvent in an amount of up to 1 wt % and hydrochloric acid in an amount of up to 1 ppm, based on the total weight of recycled stream 214.

In a preferred embodiment, the recycled stream 214 comprises ethylene in an amount of 55 to 100 wt %, 1-butene in an amount of up to 40 wt %, hydrocarbon solvent in an amount of up to 1 wt % and hydrochloric acid in an amount of 0 to 1 ppm, based on the total weight of recycled stream 214.

The absorption of gaseous hydrochloric acid is not adversely affected by the increased temperatures and pressures (compared with a conventional system where increased temperatures and pressures are not used) and the chemical reaction that occurs in the absorbent pores for gaseous hydrochloric acid remains the same or is improved when compared with the absorbent used in conventional systems. Because the gaseous monomers and/or comonomers do not condense in the absorbent in the disclosed system the useful service life (i.e., the life cycle) of the absorption bed is increased over conventional absorption beds (used in conventional absorption processes) where increased temperatures, pressures and flow rates are not used.

In an embodiment, the useful service life is increased by at least 10%, preferably by at least 25% and more preferably by at least 40% over a conventional absorption bed deployed in a conventional absorption process. A conventional absorption process is one where there is no slip stream that is recycled back to the absorber. In a conventional absorption process, the feed to the absorber is at least 20° C. lower, preferably at least 30° C. lower, and more preferably at least 35° C. lower than the feed in the disclosed process that includes the slip stream.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A system comprising:
a reactor in fluid communication with an absorber; wherein the reactor receives a reaction stream that comprises a monomer, a comonomer, a solvent and a catalyst and converts the monomer and comonomer into a polymer or interpolymer; wherein the absorber comprises an absorption bed that is operative to absorb hydrochloric acid from a product stream received from the reactor;
a first heat exchanger located downstream of the absorber and in fluid communication with the absorber; wherein the first heat exchanger is operative to condense a gaseous output from the absorber;

9 a collection drum that is operative to receive a condensate from the first heat exchanger; wherein the condensate in the collection drum is split into a slip stream and a second stream; and a compressor; wherein the compressor lies downstream of the collection drum and wherein the compressor is operative to pressurize the slip stream prior to recycling it to the absorber.

2. The system of claim 1, wherein the compressor heats the slip stream to a temperature that is at least 20 degrees higher in temperature than a temperature of the product stream received at an inlet of the absorber.

3. The system of claim 1, further comprising a second heat exchanger located downstream of the compressor and upstream of the absorber; wherein the second heat exchanger is operative to reduce a temperature of the pressurized slip stream received from the compressor.

4. The system of claim 1, further comprising a position indicator located downstream of the collection drum; wherein the position indicator is operative to determine monomer and/or comonomer condensation efficiency in the absorber; and wherein the condensation efficiency is determined by flow rate of the condensate or by a valve position.

5. The system of claim 1, wherein the collection drum is operative to indicate condensation efficiency of the absorber in preventing condensation of monomers and/or comonomers used to produce the polymer or the interpolymer; and wherein the efficiency is determined by the height of a column of condensate in the collection drum.

6. The system of claim 1, wherein the temperature is at least 20 to 40 degrees higher than the temperature of the product stream received at the absorber.

7. The system of claim 1, wherein the system is operative to remove substantially all hydrochloric acid from the product stream while preventing condensation of the monomers and/or comonomers from the product stream in the absorption bed.

8. A method comprising:

discharging from a reactor to an absorber a product stream that comprises a polymer or interpolymer, a solvent and hydrochloric acid;

absorbing the hydrochloric acid from the product stream in the absorber;

discharging the product stream now devoid of substantially all hydrochloric acid to a first heat exchanger; wherein the first heat exchanger is operative to condense the product stream devoid of hydrochloric acid from the absorber;

discharging a condensate from the first heat exchanger to a collection drum that is operative to receive a condensate from the first heat exchanger;

splitting up the condensate in the collection drum into a slip stream and a second stream; and discharging the slip stream to a compressor; wherein the compressor is operative to pressurize the slip stream prior to recycling it to the absorber.

9. The method of claim 8, wherein the compressor heats the slip stream to a temperature that is at least 20 degrees higher than a temperature of the product stream received at an inlet of the absorber.

10. The method of claim 8, further comprising discharging the pressurized slip stream to a second heat exchanger from the compressor; where the second heat exchanger is located downstream of the compressor and upstream of the absorber; wherein the second heat exchanger is operative to reduce a temperature of the pressurized slip stream received from the compressor to a temperature that is at least 20 degrees higher than a temperature of the product stream received at an inlet of the absorber.

* * * * *